United States Patent
Anderson et al.

(10) Patent No.: US 9,596,868 B2
(45) Date of Patent: Mar. 21, 2017

(54) SYSTEM FOR PROCESSING CARCASS PARTS

(71) Applicant: MAREL MEAT PROCESSING INC., Des Moines, IA (US)

(72) Inventors: Greg Anderson, Des Moines, IA (US); William Scarpino, Des Moines, IA (US); Kacie George, Ankeny, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 0 days.

(21) Appl. No.: 14/787,125

(22) PCT Filed: Apr. 28, 2014

(86) PCT No.: PCT/EP2014/058620
§ 371 (c)(1),
(2) Date: Oct. 26, 2015

(87) PCT Pub. No.: WO2014/174121
PCT Pub. Date: Oct. 30, 2014

(65) Prior Publication Data
US 2016/0106113 A1    Apr. 21, 2016

Related U.S. Application Data

(60) Provisional application No. 61/816,259, filed on Apr. 26, 2013.

(51) Int. Cl.
*A22B 5/00*   (2006.01)
*A22C 17/02*   (2006.01)
*A22C 17/00*   (2006.01)

(52) U.S. Cl.
CPC ............ *A22C 17/02* (2013.01); *A22B 5/0058* (2013.01); *A22C 17/0006* (2013.01)

(58) Field of Classification Search
CPC ... A22B 5/0029; A22B 5/0017; A22B 5/0041; A22B 5/20; A22B 5/203; A22C 17/006; A22C 17/004
(Continued)

(56) References Cited

U.S. PATENT DOCUMENTS 4,662,029 A * 5/1987 Helsene ............... A22B 5/0041
                                                                452/156
5,370,573 A * 12/1994 Warren ............... A22C 21/0023
                                                                452/149
(Continued)

FOREIGN PATENT DOCUMENTS

CN       1368009 A     9/2002
CN     102858181 A     1/2013
(Continued)

OTHER PUBLICATIONS

International Search Report for corresponding International PCT Application No. PCT/EP2014/058620, May 27, 2014.
(Continued)

*Primary Examiner* — Richard Price, Jr.
(74) *Attorney, Agent, or Firm* — Workman Nydegger (57) ABSTRACT

A system for processing carcass parts includes an overhead conveyor and a saw module comprising supporting means for interacting with a lower end portion of each incoming carcass part, the supporting means adjusting an angular position of the carcass parts as a result of the carcass parts resting at least partly on the supporting means while being conveyed by the overhead conveyor. A positioning conveyor having a plurality of spaced-apart positioning pair structures arranged below the overhead conveyor and adjacent to the supporting means receives the carcass parts from the supporting means. Each carcass part is guided into a predetermined position within the positioning pair structures and cut at a predetermined position, e.g. defined by a 360° cut (Continued)

through skin and muscle structures of each of the carcass parts.

16 Claims, 7 Drawing Sheets

(58) Field of Classification Search
USPC ........ 452/136, 148–151, 153–157, 160, 166, 452/170
See application file for complete search history.

(56) References Cited

U.S. PATENT DOCUMENTS

| | | | | |
|---|---|---|---|---|
| 5,429,549 | A * | 7/1995 | Verrijp | A22C 21/0023 452/154 |
| 5,727,997 | A | 3/1998 | Dufour et al. | |
| 6,558,243 | B2 | 5/2003 | Minemura et al. | |
| 6,736,717 | B1 * | 5/2004 | Annema | A22C 21/003 452/151 |
| 8,096,860 | B2 * | 1/2012 | Bolte | A22C 17/002 452/157 |
| 8,202,143 | B1 | 6/2012 | Taylor | |
| 8,500,523 | B1 * | 8/2013 | Hart | A22C 17/002 452/154 |
| 9,004,988 | B2 | 4/2015 | Van Der Steen et al. | |
| 9,192,172 | B2 | 11/2015 | Van Der Steen et al. | |
| 2002/0102932 | A1 | 8/2002 | Minemura et al. | |
| 2008/0064315 | A1 | 3/2008 | Annema et al. | |
| 2010/0323599 | A1 | 12/2010 | Hiddink et al. | |
| 2012/0315834 | A1 | 12/2012 | Van Der Steen et al. | |
| 2013/0029574 | A1 | 1/2013 | Van Der Steen et al. | |
| 2016/0037787 | A1 | 2/2016 | Van Der Steen et al. | |

FOREIGN PATENT DOCUMENTS

| | | |
|---|---|---|
| EP | 1097644 A1 | 5/2001 |
| WO | 2007147412 A1 | 12/2007 |
| WO | 2011074969 A2 | 6/2011 |

OTHER PUBLICATIONS

Chinese Search Report from Corresponding CN Application 2014800237710, Jul. 13, 2016.

* cited by examiner

SYSTEM FOR PROCESSING CARCASS PARTS

FIELD OF THE INVENTION

This invention is directed to a system of processing carcass parts, e.g. removing a hock/shank from a pork shoulder and more particularly to a system having an incision and saw modules.

BACKGROUND OF THE INVENTION

Removing a hock/shank from a pork shoulder is known in the art. Typically, the shoulder lays upon a horizontal conveyor whereupon the foot is removed manually prior to deboning. This process leads to inconsistent cuts and yields loss. In addition, as a result, bone dust will show on the meat.

To improve upon the conventional process, increase consistency of the cut, improve yields and reduce the showing of bone dust, the shoulder or picnic is hung vertically by the foot and stabilized to prevent swinging. Also, the jowl or breast flap is pressed down to permit a finer edge cut of the skin and other soft tissue.

SUMMARY OF THE INVENTION

On the above background it is an object of embodiments of the present invention to provide a system for processing carcass parts such as forends of pork where the yield of the processing is significantly increased and where e.g. the hock/shank removal is improved such that a negligible amount of bone dust is formed.

Embodiments of the invention preferably seeks to mitigate, alleviate or eliminate one or more of the above mentioned disadvantages singly or in any combination. In particular, it may be seen as an object of embodiments of the present invention to provide a system that solves the above mentioned problems, or other problems, of the prior art.

To address one or more of these concerns, in a first aspect of the invention a system is for processing carcass parts is provided, the system including an overhead conveyor having a plurality of shackles attached to the overhead conveyor for conveying the carcass parts in a transport direction, where the shackles are adapted to carry the carcass parts with a first upper end portion of each carcass part being suspended from and secured to one or more of the shackles, the system comprising:

a saw module comprising:
   a supporting means for interacting with a second lower end portion of each incoming carcass part, the supporting means being adapted to adjust an angular position of the carcass parts as a result of the carcass parts resting at least partly on the supporting means while being conveyed by the overhead conveyor,
   a positioning conveyor arranged below the overhead conveyor and adjacent to the supporting means for receiving the carcass parts from the supporting means, the positioning conveyor comprising:
     a conveyor belt drivable at substantially the same speed in said transport direction as the overhead conveyor with a side of the conveyor belt facing the overhead conveyor,
     a plurality of spaced apart positioning pair structures arranged on the conveyor belt for moving with the belt,
   a saw module controller for controlling movement of the belt and for synchronizing the position of the spaced apart positioning pair structures on the belt with the position of the incoming carcass parts such that each carcass part may be guided into a predetermined position within the positioning pair structures, and
   a rotating saw blade for performing a planar cut through each of the carcass parts while the carcass part rests in said spaced apart positioning pair structures,
   a rotating saw blade for effecting said planar cut at a predetermined cutting position at each of the carcass parts.

Thanks to the rotating saw blade and the positioning pair structures, the planar cut may be precisely effected at the predetermined cutting position. The positioning pair structures are preferably spaced apart in the transport direction (referred to herein also as the "conveying direction"). They are preferably arranged in a common plane extending in the transport direction. The adjustment of the angular position of the carcass part may include tilting or inclining the carcass part relative to vertical and/or relative to horizontal, e.g. in a plane, which extends transversely, such as perpendicularly, to the transport direction.

A rotating saw blade controller for positioning the rotating saw blade and controlling operation thereof to effect said planar cut at the predetermined cutting position at each of the carcass parts may be provided.

In one embodiment, the predetermined cutting position is defined by and intersects with a plane of a 360° cut performed through skin and muscle structures of each of the carcass parts below the shackles at a position upstream of the saw module when viewed in the conveying direction, wherein 360° degrees cut extend only partially through the carcass parts without completely dividing each of the carcass parts into separate sections.

The carcass parts may in one embodiment be forends of pork and the 360° cuts through the skin and meat may be done around the ulna/radious of the forends of pork. The position of the spaced apart positioning pairs may thus be synchronized to the position of the incoming forends such that portions between the feet and the 360° cuts of the forends becomes guided in a pre-set position (referred to herein also as predetermined position).

The 360° cuts are preferably performed at the very beginning of the processing whereas the sawing process is performed at the very end of the processing, e.g. after de-skinning, de-boning etc. of the pork forends has taken place.

The fact that the sawing blade saws at the position where the 360° cut is, i.e. the position of the sawing plane is the same as the plane of the 360° cut, only a portion of the bone dust is formed. Also, the cut itself appear clean and appealing compared to if the sawing is performed manually, and such a clean and appealing appearance of the sawing cut increases the value of the meat pieces. If the meat pieces are forends of pork, e.g. the shoulder part, the sawing cut may be performed through the Eisbein of the shoulder part such that the Eisbein and the skin part form a smooth planar cut.

In one embodiment, each of the positioning pair structures comprises an upwardly extending structure positioned at the downstream side in relation to the transport direction of the conveyor belt and an elongated structure having a first end mounted to the conveyor belt and a second upwardly extending free end facing the upwardly extending structure. The advantage of utilizing such a setup, especially such an elongated structure, is that the receiving end of the positioning conveyor, which preferably is the area where the 180° change in the conveying direction occurs, is that a temporary extra space is created between the upwardly extending free end of the elongated structure and the upwardly extending structure because the elongated structure extends out from the belt at the driving. Thus, a time window is generated for receiving the incoming carcass parts, e.g. the above mentioned forends of pork. Subsequent to the 180° transfer path of the elongated structure(s), the space between the upwardly extending free of the elongated structure is reduced which ensures that the carcass part is in a stationary position.

In one embodiment, the conveyor belt comprises first and second mutually separated endless chains arranged opposite to the cutting plane of the rotating cutting blade, the second separated endless chain being positioned distally away from the overhead conveyor compared to the first endless chain, wherein the plurality of spaced apart positioning pair structures are mounted to at least one of the two separate endless chains. In that way, it is possible to e.g. utilize positioning pair structures on both the endless chains to contribute in supporting a single carcass part while being sawed.

In one embodiment, the plurality of spaced apart positioning pair structures (105) are arranged on the first endless chain, wherein a plurality of the elongated structures (117) are arranged on the second endless chain with its free ends pointing in the same direction as the plurality of the elongated structures on the first endless chain. It may be preferred to utilize only such elongated structures on the second endless chain and no upwardly extending structures to provide a push function, but at this position the part of the carcass part may be much thicker than where the positioning pair structures on the first endless chain are located. This is e.g. the case where the carcass part is the shoulder or the leg of a pig.

Accordingly, in both the above mentioned embodiments it is ensured, during the cutting, that the carcass part will not slide or move in any way during the cutting.

The first and the second separated endless chains may have a rotational axis that is parallel to a surface area on which the system is resting.

In one embodiment, the elongated structures on the first and the second endless belts that are arranged to guide a single carcass part into the predetermined position are arranged at a predetermined position in the transport direction of the positioning conveyor and transversely spaced apart. For example, the elongated structures on the first and the second endless belts that participate in guiding a single carcass part in a pre-set position (referred to herein also as a predetermined position) are arranged opposite to each other such that a reference line extending between the oppositely arranged positioning pair structures is perpendicular to the conveying direction of the positioning conveyor. This may be the scenario where e.g. a customer required that the sawing is perpendicular to a longitudinal axis of the bone that is being cut, e.g. the above mentioned Eisbein. Alternatively, the elongated structures on the first and the second endless belts that participate in guiding a single carcass part in a pre-set position are arranged opposite to each other such that a reference line extending between the oppositely arranged positioning pair structures forms an acute angle in relation to a reference line perpendicular to the conveying direction of the positioning conveyor. This would be the case where e.g. a customer desires that cut through the bone to form an angle, e.g. so as to have cuts looking different from typical cuts that are perpendicular to the bone. In such cases, the 360° cuts would also be angled in relation to a longitudinal axis of the bone where the sawing through the bones are performed.

In one embodiment, the first and the second endless chains are drivable by separate driving wheels so as to allow mutual adjustment of the elongated structures on the first and the second endless belts that participate in guiding a single carcass part into the predetermined position during operation of the saw module. This means that the sawing, e.g. through the Eisbein of a forend of a pork, may be adjusted based on e.g. customers order. Also, this may be of relevance where e.g. left and right forends are present in the system at the same time, where in order to obtain identical cuts the internal position between the elongated structures on the first and the second endless belts must be adjusted. This may be done fully automatically where any type of a recognition system, e.g. a digital camera, monitors the types of the carcass parts where based on this monitoring a signal is triggered indicating whether or not an internal adjustment in the elongated structures is needed or not.

In one embodiment, the supporting means comprises at least one first free end arranged such that it may interact with incoming substantially freely hanging carcass parts and at least one second free end, the at least one second free end being aligned with a receiving end of the positioning conveyor and acting as an in-feed end for the positioning conveyor during operation thereof. Thus, a smooth transfer is provided from where the freely hanging carcass parts arrive until they are received by the positioning conveyor of the saw module which ensures that the carcass parts with be properly guided within the positioning pair structures.

In one embodiment, the supporting means comprises at least one cam rod, the at least one first free end of the angle adjustment means comprising a first free end portion of the at least one cam rod, and the at least one second free end of the angle adjustment means comprising a second free end portion of the at least one cam rod.

In one embodiment, the supporting means is arranged such that the angle position of an incoming carcass part is adjusted to be between 1° to 90°, preferably between 20° to 70°, more preferably between 40° to 50°, most preferably around 45°.

Accordingly, by utilizing such a supporting means that adjusts the angular position as here above, the gravity contributes in pressing the carcass parts down such that it becomes become guided in the above mentioned pre-set position.

In one embodiment, the system further comprises an incision module comprising at least one cutting blade adapted to perform the 360° cuts of the carcass parts through the skin and the muscle while the carcass parts are conveyed through the incision module by the overhead conveyor, the 360° cuts being performed at a pre-set position and before the incoming carcass parts undergo at least one subsequent processing step. In one embodiment, the 360° cuts may be pre-set at a fixed position at all times, or the position of the 360° cuts may be adapted to customers need. In such cases, the incision module further comprises a moving mechanism for moving the at least one cutting blade up or down in accordance to a given input value indicating the desired position of the cut.

In one embodiment, the incision module comprises a pair of retractable arms having rotatable cutting blades mounted to the ends of the arms, wherein the cutting blades have a substantially parallel rotation axis. The retractable arms may comprise at least one spring for applying the appropriate force needed when making the cut. Moreover, the retractable arms may be rotatable around vertical and parallel axis so as to maintain the proper cutting depth over the entire length of the cut.

In one embodiment, the incision module comprises a conveyor having a plurality of flights, cleats or pins extending outwardly from the conveyor to form a pocket for receiving the carcass parts so as to position and stabilize the carcass parts in preparation of an incision. In one embodiment, the speed of the conveyor of the incision module is controllable to match the speed of the overhead conveyor so that the flights remain positioned with the shackles. The incision module is in one embodiment a closed loop carousel-like conveyor that is arranged horizontally with a vertical rotation axis.

According to a second aspect a method is provided of processing carcass parts using the above mentioned system, comprising:

adjusting an angular position of incoming carcass parts from being freely hanging to form an angle while at least partly resting on the supporting means, the adjustment of the angular position being performed subsequent to the carcass parts having undergone previous processing steps including a processing step where the carcass parts undergo 360° cuts through the skin and meat of the carcass parts below the shackles, wherein said 360° degrees cuts extend only partially through the carcass parts without completely dividing each of the carcass parts into separate sections, and wherein said 360° cuts define a cutting plane in each carcass part, receiving the carcass parts in the adjusted angular position while the carcass parts are simultaneously being conveyed, guiding the carcass parts into a predetermined position while the carcass parts are simultaneously being conveyed, and subsequently sawing completely through the carcass parts along a plane coinciding with said cutting plane while the carcass parts are simultaneously being conveyed.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which

FIG. 7A-D depicts graphically the cutting process, showing that the respective one of the cutting blades cuts approximately 180° cut which results in the above mentioned 360° cut.

DETAILED DESCRIPTION OF THE PREFERRED EMBODIMENTS

As will be discussed later in more details in relation to FIGS. 1-7 the present invention relates to a system for processing carcass parts. The carcass parts may be, but are not limited to, the frontend parts of the pork, e.g. the picnic or whole shoulder parts, and/or the leg parts, e.g. shank end or the ham, of the pork.

For simplicity, in the following it will be assumed that the carcass parts are the picnic or whole shoulder parts of pork.

In an embodiment the system comprises a hock/shank incision and removal system including an overhead main conveyor having a plurality of shackles attached to the conveyor. A picnic or whole shoulder is loaded on the main conveyor, which as will be discussed in more detail below is an overhead conveyor, by securing the foot of the shoulder to the shackle.

The shoulder is then transported by the main conveyor to an incision module. The incision module has a conveyor having a plurality of flights, cleats or pins that extend outwardly from the conveyor to form a pocket that receives the shoulder to position and stabilize the shoulder in preparation of an incision. The speed of conveyor matches the overhead conveyor so that the flights remain positioned in relation to the shackles. The incision module also has a cutting assembly that includes a frame having a pair of retractable arms and that have rotatable blades and mounted to the ends of arms. Also, connected to the frame is a guide rod that is angled downwardly from the entry end of the module toward the exit end of module. The height of the frame, and thus the cutting plane of the blades and is adjustable.

As the shoulder enters the incision module, the meat side of the picnic engages the guide rod such that the jowl or breast flap is pushed down preventing any type of meat to bunch up in the plane of the cutting blades. The guide rod also stabilizes the shoulder and prevents swinging.

As the shoulder passes the cutting assembly, a clean and level precut incision is made through the skin and meat around the ulna/radius of the shoulder. More specifically, the first cutting arm on the outer side of the shoulder makes a 180° skin and meat cut while the second cutting arm finishes the 360° cut by making a 180° cut on the inside of the hock/shank. The depth of the cut is achieved with air pressure applied to arms and guides positioned around the rims of the blades.

Once the precut incision is made, the shoulder is transported from the incision module to a trimming station by the main conveyor. At the trimming station, the shoulder is trimmed, left bone in or deboned which leaves just the elbow attached.

The elbow is then transported by the main conveyor to a saw module. The saw module includes a cam rod that engages and positions the elbow at approximately a 45° angle in relation to the main conveyor. The elbow is then supported by a positioning conveyor. The positioning conveyor rotates at a speed similar to the main conveyor so that the elbow matches the shackles. As the elbow approaches a cutting mechanism, a weighted rod engages the top of the elbow to push the hock down into flights on the conveyor to ensure proper loading. There are two sets of flights to support the elbow with one on each side of the round blade of the cutting mechanism. One flight is positioned close to the part of the shank to prevent any meat to be folded or pushed into the path of the blade. The blade is rotatably mounted to an adjustable support and is set based upon hock specifications. As the elbow is transported past blade, the hock/shank is supported by a fixed plate or anvil throughout the entire cut to ensure proper positioning. The hock/foot remains attached to the shackle until it exits the saw module where it is transported to a foot removal station.

Figure 1:
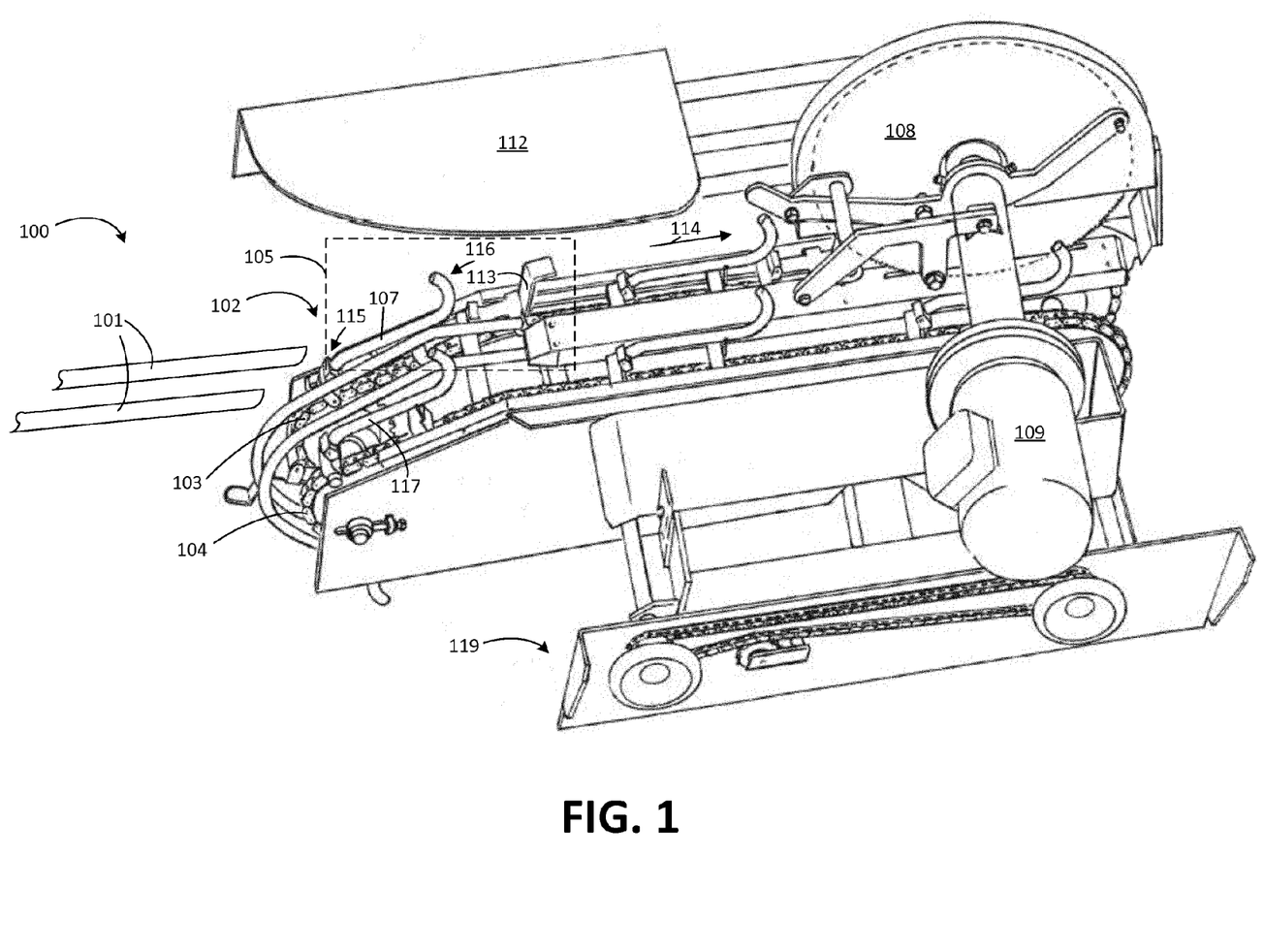
FIG. 1 depicts an embodiment of the saw module of the system according to the present invention for processing carcass parts that are secured to the plurality of shackles attached to the overhead conveyor.

FIG. 1 depicts an embodiment of the saw module 100 of the system according to the present invention for processing carcass parts that are secured to the plurality of shackles attached to the overhead conveyor.

The saw module 100 comprises a supporting means 101, 112, a positioning conveyor 102 and a rotating saw blade 108 driven by a motor 109.

As depicted here, the supporting means comprises two cam rods or bars 101, but the number does not have to be limited to only two cam rods having first and second sets of free ends. The first sets of free ends is the one that initially physically interacts with the freely hanging shoulder parts (or any type of carcass parts) and change their angular position from being vertical to an angular position that may be, but is not limited to, 1° to 90°, preferably between 20° to 70°, more preferably between 40° to 50°, most preferably around 45°.

The second sets of free ends shown here are positioned slightly above the receiving end of the positioning conveyor 102 such that incoming shoulder parts slide from the second sets of free ends onto the positioning conveyor 102.

The supporting means in this embodiment further comprises a plate structure 112 to provide a further support to the shoulder parts after being released from the two cam rods or bars 101 onto the positioning conveyor 102.

The positioning conveyor 102 comprises a conveyor belt and a plurality of spaced apart positioning pair structures 105 arranged on the conveyor belt. The conveyor belt is preferably driven at substantially the same speed as the overhead conveyor with the side of the conveyor belt facing the overhead conveyor moving in the same direction as the overhead conveyor. This will be illustrated further in relation to FIG. 2. The position of the plurality of spaced apart positioning pair structures 105 is synchronized to the position of the incoming shoulder parts such that the shoulder parts become guided in a pre-set position within the positioning pair structures.

The conveyor belt comprises a first and a second separated endless chains 103, 104 arranged opposite to the cutting plane of the rotating saw blade 108, where the second separated endless chain 104 is position distally away from the overhead conveyor (not shown) compared to the first endless chain 103.

In the embodiment shown here each of the positioning pair structures comprise an upwardly extending structure 113 positioned at the downstream side in relation to the conveying direction of the conveyor belt as indicated by an arrow 114, and an elongated structure 107 having a first end 115 mounted to the conveyor belt and a second upwardly extending free end 116 facing the upwardly extending structure 113. The upwardly extending structure 113 is as shown here a simple thin plate structure, e.g. of few centimeters width and height, and acts as a kind of a stopper for the shoulder parts (the carcass parts), whereas the second upwardly extending free end 116 of the elongated structure 107 provides a pushing force onto the shoulder parts towards the upwardly extending structure 113 and thus ensures that the shoulder part will be fixed within the positioning pair structure 105.

The plurality of spaced apart positioning pair structures shown here are mounted to the first endless chain 103, whereas a plurality of elongated structures 117 are arranged on the second endless chain 104 with the free ends pointing in the same direction as the plurality of the elongated structures on the first endless chain.

The internal position of the elongated structures 107, 117 may be such that the elongated structures on the first and the second endless belts that participate in guiding a single carcass part in a pre-set position are arranged opposite to each other such that a reference line extending between the oppositely arranged positioning pair structures is perpendicular to the conveying direction of the positioning conveyor. This internal position may also be such that the sawing through the bone of the shoulder part forms an angle.

Also, the endless chains 103 and 104 may be operated separately, e.g. be arranged on separate driving wheels with associated driving mechanism 119, so as to allow adjusting internal position between the elongated structures 107, 117, which could e.g. be the case if both right foot and left foot are present in the system at the same time.

Figure 2:
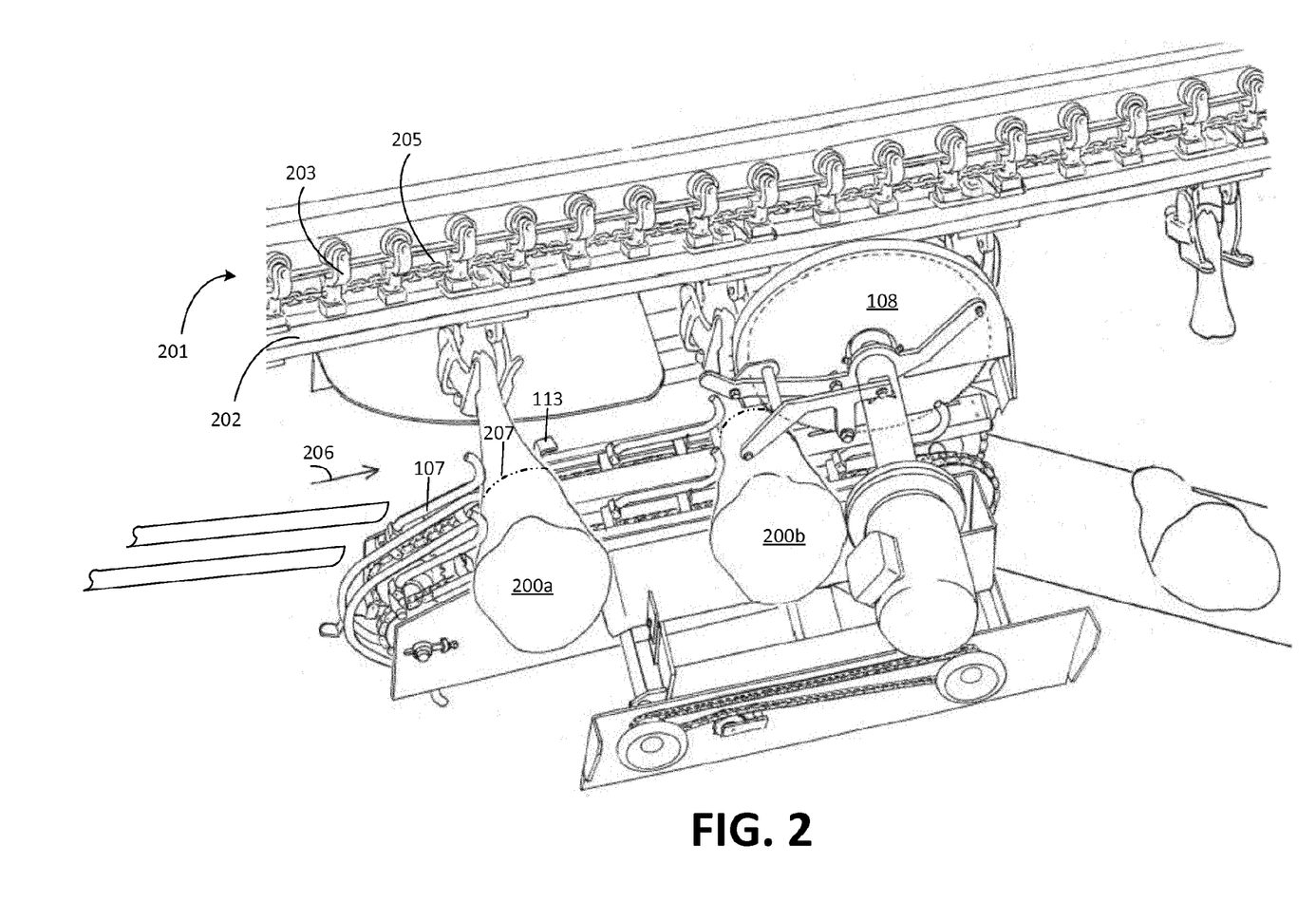
FIG. 2 shows the saw module in FIG. 1 and additionally shows the overhead conveyor comprising a plurality of shackles 203 slidable attached to the overhead conveyor via trolleys, FIG. 3 show an example of a shackle that may be implemented and that is attached to an overhead conveyor.

FIG. 2 shows the saw module 100 in FIG. 1 and additionally shows the overhead conveyor 201 comprising a plurality of shackles 203 slideably attached to the overhead conveyor via trolleys on guide rail 202, where the shackles 203 are adapted to carry the carcass parts during the processing by means of securing the carcass parts to the shackles. Shown is also a driving chain 205 that keeps the shackles internally fixed but provides movement of the shackles in the conveying direction as indicated by the arrow 206.

Shown are two forends of pork 200a,b at two different positions, forend 200a has just been guided in a pre-set position within the positioning pair structures, whereas forend 200b is undergoing the sawing process.

Shown is also the 360° cuts 207 that has been done at an incision module, that will be discussed in more details later. The position of the rotating saw blade 108 is such that the sawing plane intersects with the plane of the 360° cut 207 when sawing there through.

Figure 3A:
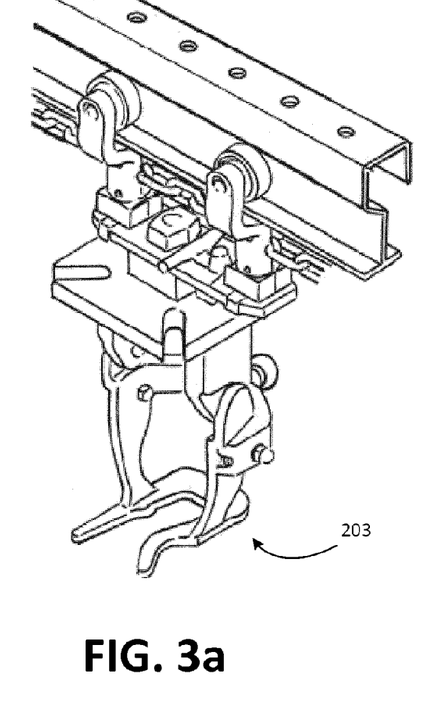
Figure 3B:
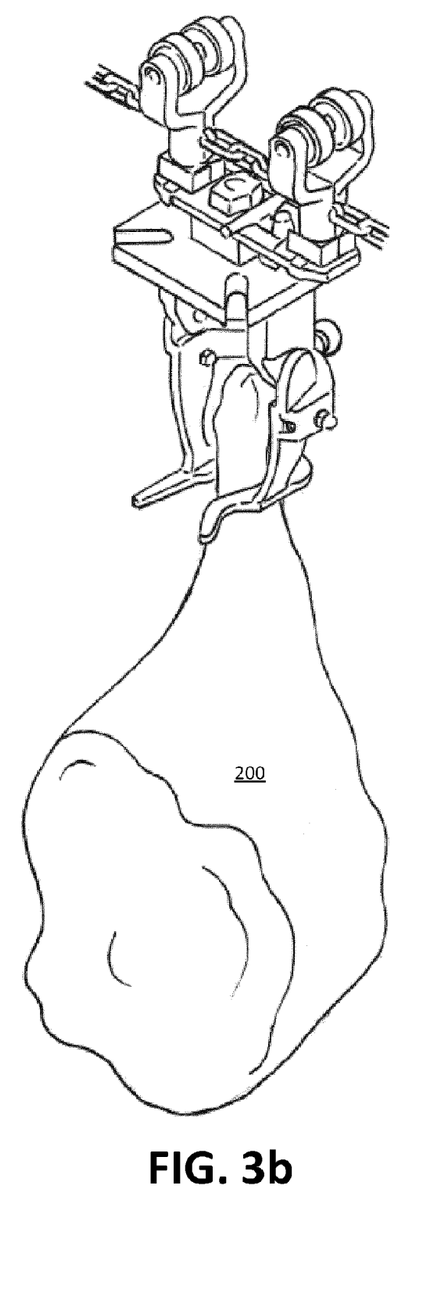

FIG. 3a show an example of a shackle that may be implemented and that is attached to an overhead conveyor, and FIG. 3b shows a forend of a pork being placed into the shackle. More details for such a shackles overhead transport-conveyor system may be found in WO2011/074969, e.g. on p. p. 59 1. 26-p. 60 1.12 and figure, and p. 65 1. 17-p. 69 1.7 and FIGS. 25-25, hereby incorporated by reference.

Figure 4:
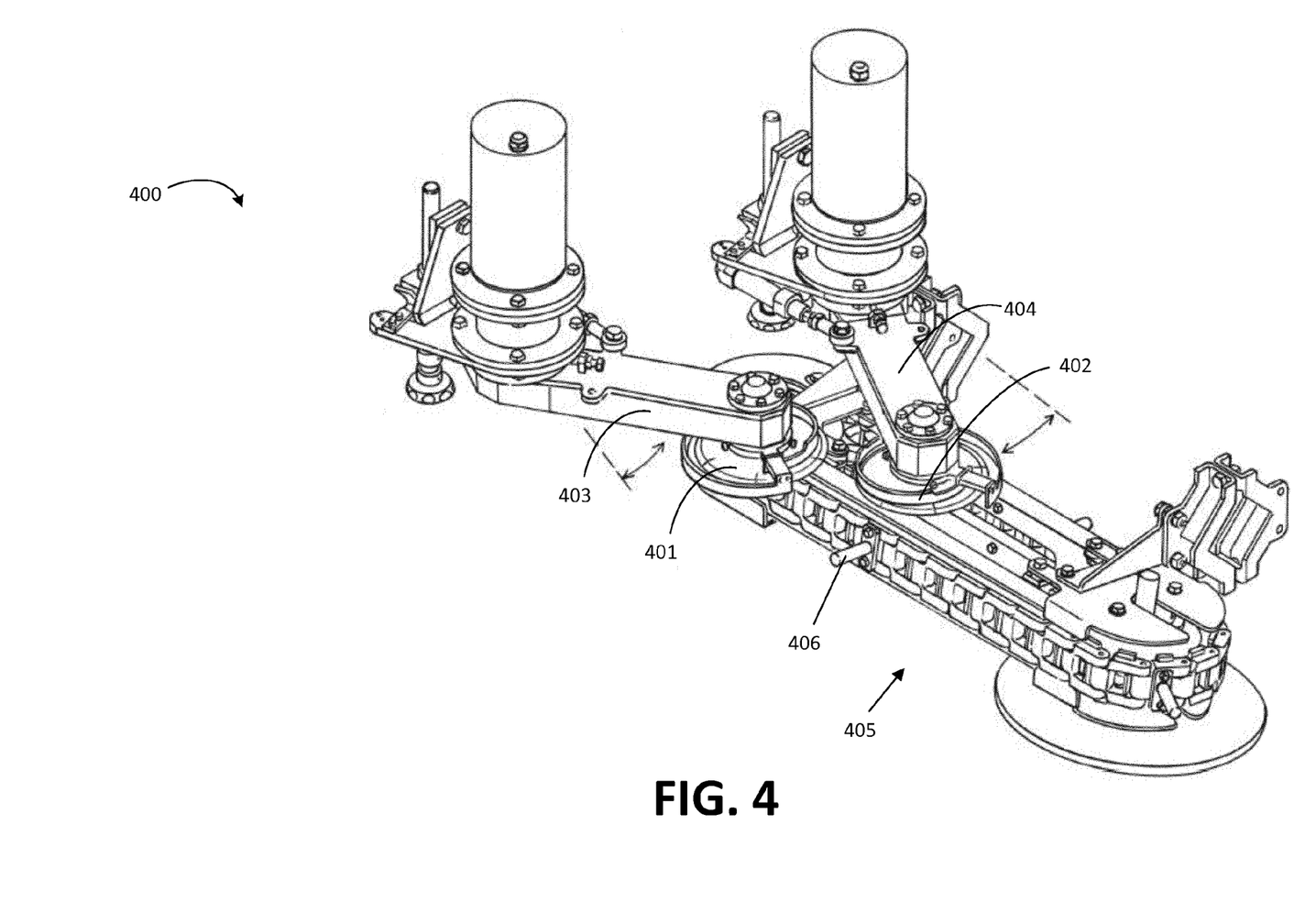
FIG. 4 shows on embodiment of an incision module according to the present invention for performing 360° cuts.

FIG. 4 shows on embodiment of an incision module 400 according to the present invention for performing the above mentioned 360° cuts. The incision module comprises two rotatable circular cutting blades 401, 402 mounted on arms 403, 404 adapted to perform the 360° cuts of the carcass parts while the carcass parts are conveyed through the incision module 400 by the overhead conveyor. The 360° cuts are performed at a pre-set position and before the incoming carcass parts undergo at least one subsequent processing step. In this embodiment, the cutting blades mounted to retractable arms and are placed in a coplanar way.

The incision module 400 further comprises a horizontal arranged conveyor 405 having a plurality of flights, cleats or pins 406 extending outwardly from the conveyor to form a pocket for receiving the carcass parts so as to position and stabilize the carcass parts in preparation of an incision. The speed of the conveyor 405 preferably matches with the speed of the overhead conveyor so that the flights remain positioned with the shackles.

Figure 5:
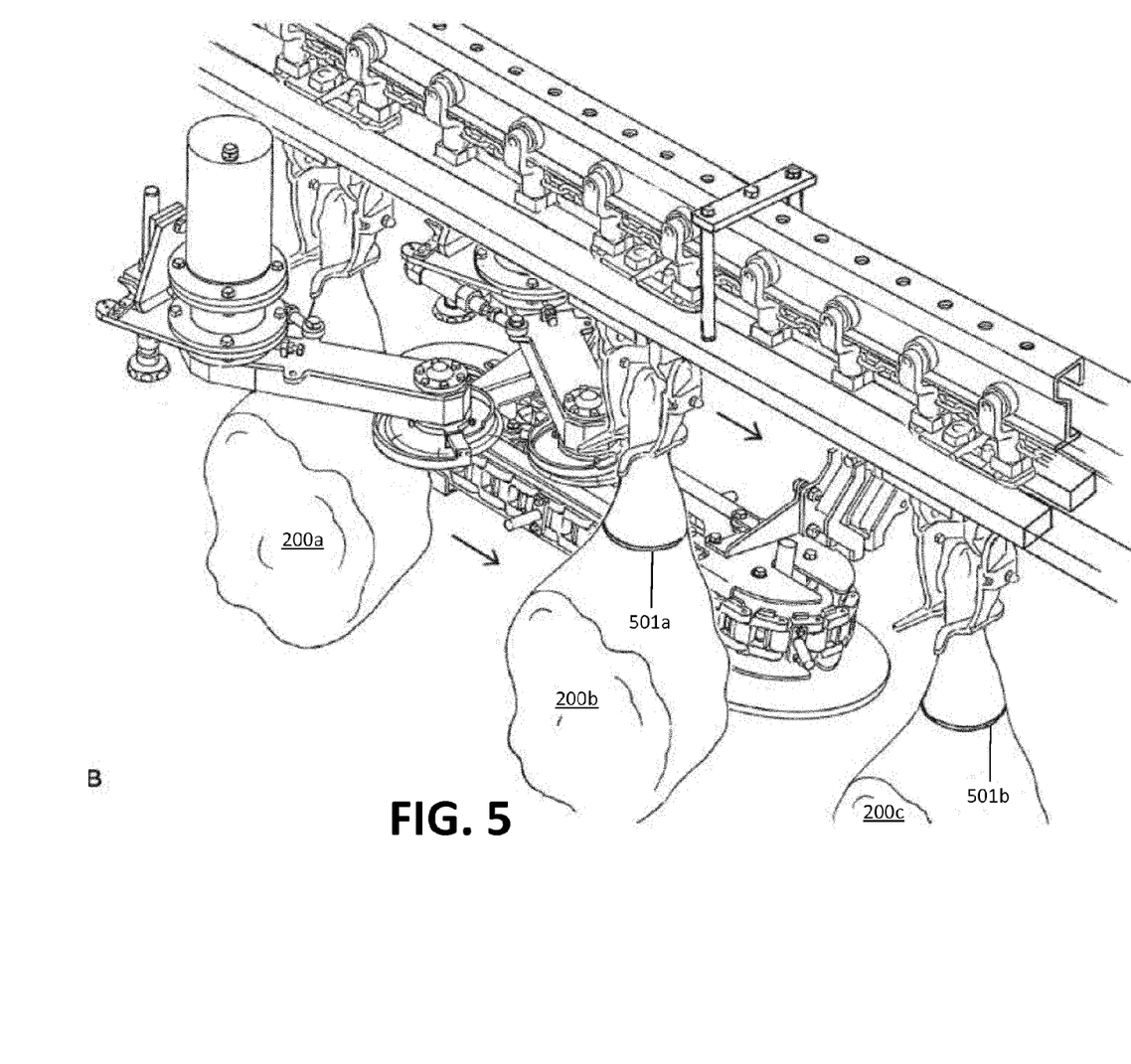
FIG. 5 shows the incision module in FIG. 4, and further shows three forends of pork two of which have undergone the 360° cutting process resulting in the 360° cuts.

FIG. 5 shows the incision module in FIG. 4, and further shows three forends of pork 200a,b,c, two of which have undergone the 360° cutting process resulting in the 360° cuts 501a,b.

Figure 6:
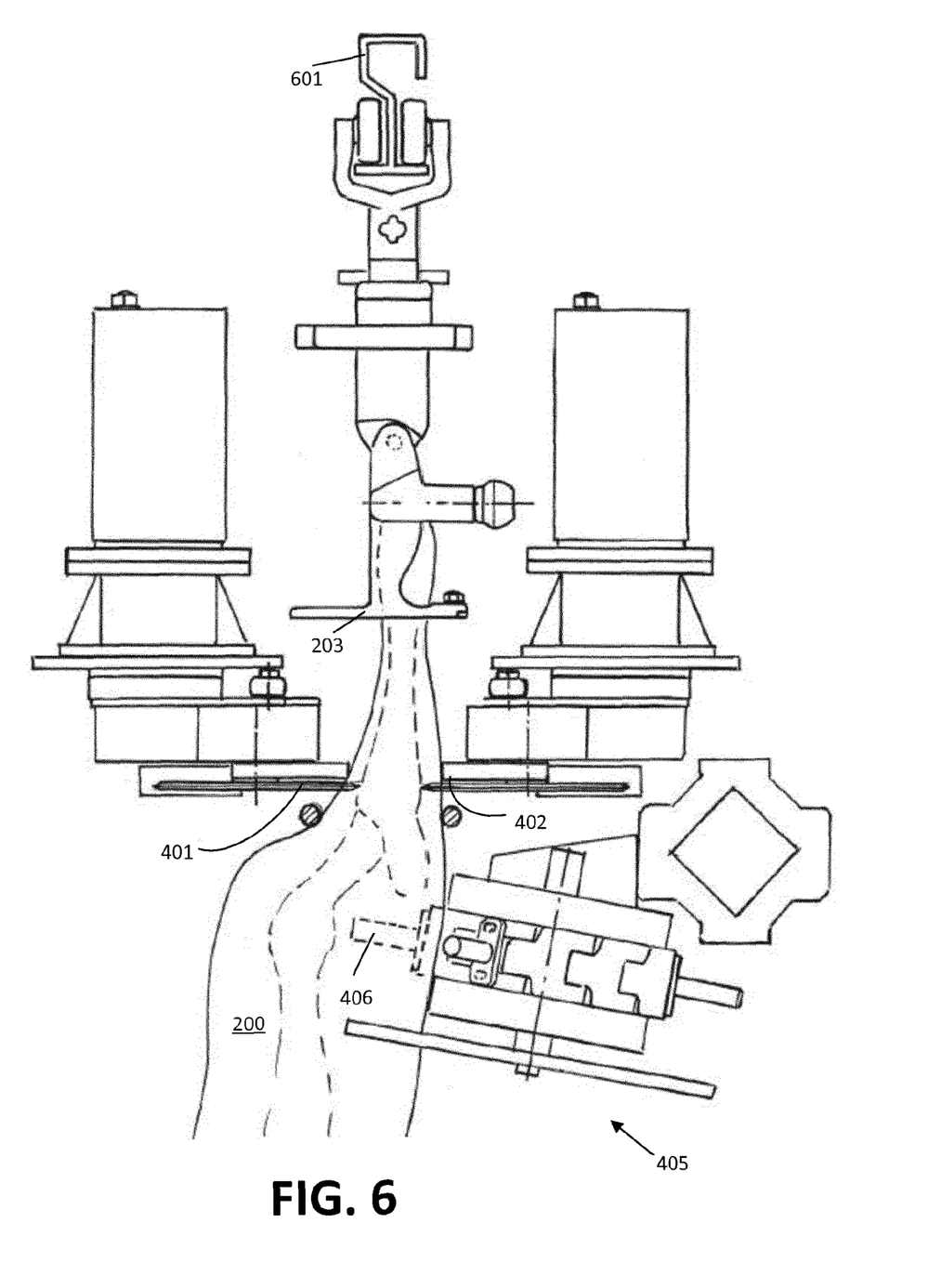
FIG. 6 shows a cross-sectional view of the incision module in FIG. 5, and shows additionally the rail/track of the overhead conveyor and the shackle that is slideable mounted thereto.
Figure 7:
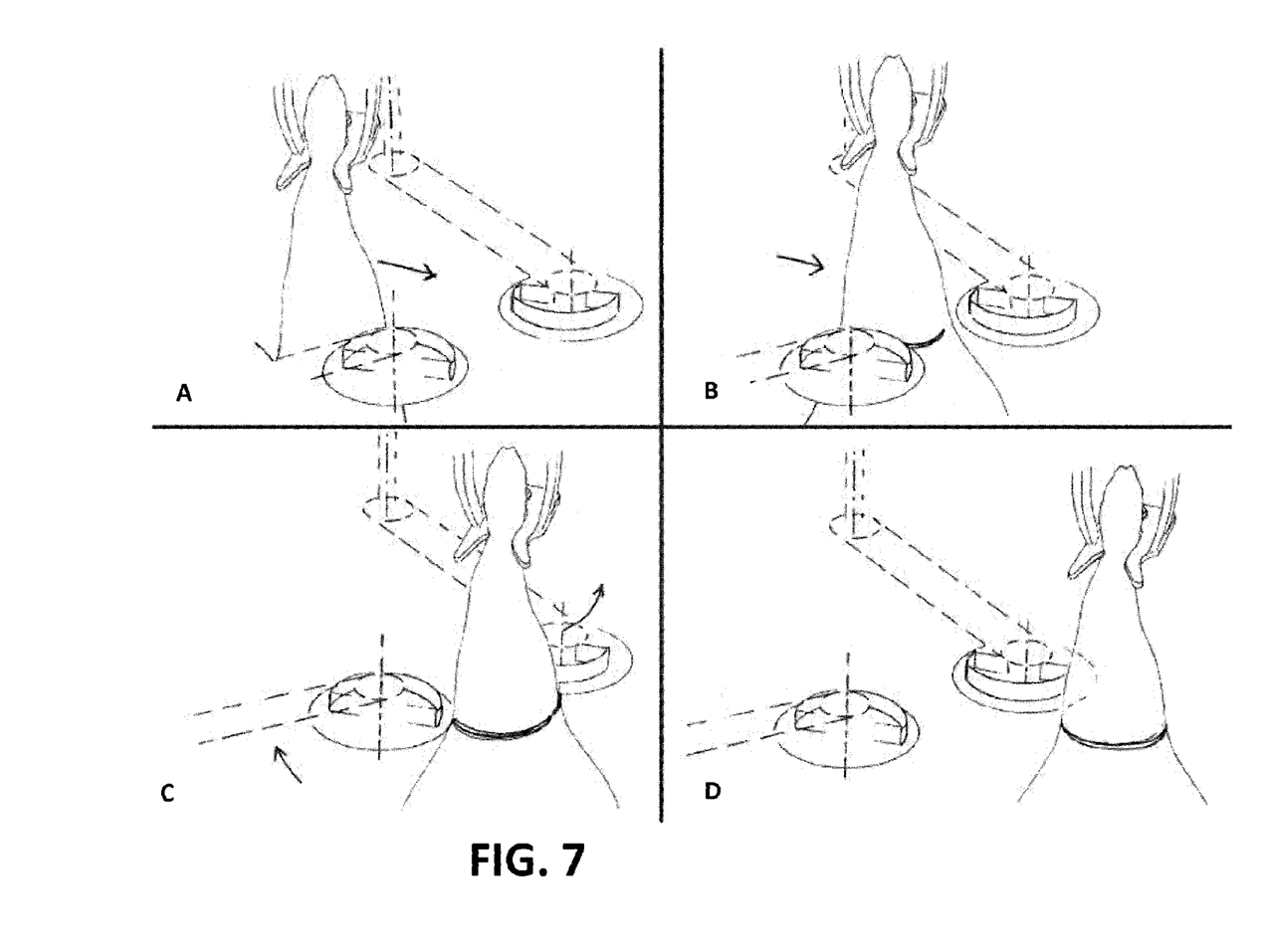

FIG. 6 shows a cross-sectional view of the incision module in FIG. 5, and shows additionally the rail/track 401 of the overhead conveyor and the shackle 203 mounted by a suspension element 601 slideably mounted thereto.

FIG. 7A-D depicts graphically the cutting process, showing that the respective one of the cutting blades cuts approximately 180° cut which results in the above mentioned 360° cut.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A system for processing carcass parts, the system including an overhead conveyor having a plurality of shackles attached to the overhead conveyor for conveying the carcass parts in a transport direction, where the shackles are adapted to carry the carcass parts with a first upper end portion of each carcass part being suspended from and secured to one or more of the shackles, the system comprising:
   a saw module comprising:
      a supporting means for interacting with a second lower end portion of each incoming carcass part, the supporting means being adapted to adjust an angular position of the carcass parts as a result of the carcass parts resting at least partly on the supporting means while being conveyed by the overhead conveyor;
      a positioning conveyor arranged below the overhead conveyor and adjacent to the supporting means for receiving the carcass parts from the supporting means, the positioning conveyor comprising:
      a conveyor belt drivable at substantially the same speed in said transport direction as the overhead conveyor with a side of the conveyor belt facing the overhead conveyor;
      a plurality of spaced apart positioning pair structures arranged on the conveyor belt for moving with the belt;
      a saw module controller for controlling movement of the belt and for synchronizing the position of the spaced apart positioning pair structures on the belt with the position of the incoming carcass parts such that each carcass part may be guided into a predetermined position within the positioning pair structures; and
      a rotating saw blade for performing a planar cut through each of the carcass parts while the carcass part rests in said spaced apart positioning pair structures;
   the rotating saw blade arranged for effecting said planar cut at a predetermined cutting position at each of the carcass parts.

2. The system according to claim 1, wherein the predetermined cutting position is defined by and intersects with a plane of a 360° cut performed through skin and muscle structures of each of the carcass parts below the shackles at a position upstream of the saw module when viewed in the conveying direction, wherein 360° degrees cut extend only partially through the carcass parts without completely dividing each of the carcass parts into separate sections.

3. The system according to claim 2, further comprising an incision module comprising at least one cutting blade adapted to perform the 360° cuts of the carcass parts through the skin and the muscle while the carcass parts are conveyed through the incision module by the overhead conveyor, the 360° cuts being performed at a pre-set position and before the incoming carcass parts undergo at least one subsequent processing step.

4. The system according to claim 3, wherein the incision module comprises a pair of retractable arms having rotatable cutting blades mounted to the ends of the arms, wherein the cutting blades have a substantially parallel rotation axis.

5. The system according to claim 3, wherein the incision module comprises a conveyor having a plurality of flights, cleats or pins extending outwardly from the conveyor to form a pocket for receiving the carcass parts so as to position and stabilize the carcass parts in preparation of an incision.

6. The system according to claim 3, where the speed of the conveyor of the incision module is controllable to match the speed of the overhead conveyor so that the flights remain positioned with the shackles.

7. The system according to claim 1, wherein each of the positioning pair structures comprises an upwardly extending structure positioned at the downstream side in relation to the transport direction of the conveyor belt and an elongated structure having a first end mounted to the conveyor belt and a second upwardly extending free end facing the upwardly extending structure.

8. The system according to claim 7, wherein the plurality of spaced apart positioning pair structures are arranged on the first endless chain, wherein a plurality of the elongated structures are arranged on the second endless chain with its free ends pointing in the same direction as the plurality of the elongated structures on the first endless chain.

9. The system according to claim 7, wherein the elongated structures on the first and the second endless belts that participate in guiding a single carcass part in a pre-set position are arranged opposite to each other such that a reference line extending between the oppositely arranged positioning pair structures is perpendicular to the conveying direction of the positioning conveyor.

10. The system according to claim 7, wherein the elongated structures on the first and the second endless belts that participate in guiding a single carcass part in a pre-set position are arranged opposite to each other such that a reference line extending between the oppositely arranged positioning pair structures form an angle in relation to a reference line perpendicular to the conveying direction of the positioning conveyor.

11. The system according to claim 7, wherein the first and the second endless chains are drivable by separate driving wheels so as to allow mutual adjustment of the elongated structures on the first and the second endless belts that participate in guiding a single carcass part into the predetermined position during operation of the saw module.

12. The system according to claim 1, wherein the conveyor belt comprises first and second mutually separated endless chains arranged opposite to the cutting plane of the rotating cutting blade, the second separated endless chain being positioned distally away from the overhead conveyor compared to the first endless chain, wherein the plurality of spaced apart positioning pair structures are mounted to at least one of the two separate endless chains.

13. The system according to claim 1, wherein the supporting means comprises at least one first free end arranged such that it may interact with incoming substantially freely hanging carcass parts and at least one second free end, the at least one second free end being aligned with a receiving end of the positioning conveyor and acting as an in-feed end for the positioning conveyor during operation thereof.

14. The system according to claim 1, wherein the supporting means comprises at least one cam rod, the at least one first free end of the angle adjustment means comprising a first free end portion of the at least one cam rod, and the at least one second free end of the angle adjustment means comprising a second free end portion of the at least one cam rod.

15. The system according to claim 1, wherein the supporting means is arranged such that the angular position of an incoming carcass part is adjusted to be between 1° to 90°.

16. A method of processing carcass parts using a system according to claim 1, comprising:
adjusting an angular position of incoming carcass parts from being freely hanging to form an angle while at least partly resting on the supporting means, the adjustment of the angular position being performed subsequent to the carcass parts having undergone previous processing steps including a processing step where the carcass parts undergo 360° cuts through the skin and meat of the carcass parts below the shackles, wherein said 360° degrees cuts extend only partially through the carcass parts without completely dividing each of the carcass parts into separate sections, and wherein said 360° cuts define a cutting plane in each carcass part;
receiving the carcass parts in the adjusted angular position while the carcass parts are simultaneously being conveyed;
guiding the carcass parts into a predetermined position while the carcass parts are simultaneously being conveyed; and
subsequently sawing completely through the carcass parts along a plane coinciding with said cutting plane while the carcass parts are simultaneously being conveyed.

* * * * *